(12) United States Patent
Sobue et al.

(10) Patent No.: US 9,475,373 B2
(45) Date of Patent: Oct. 25, 2016

(54) CENTER PILLAR WEATHER STRIP

(71) Applicant: TOYODA GOSEI CO., LTD., Kiyosu-shi, Aichi-ken (JP)

(72) Inventors: Hiroshi Sobue, Kiyosu (JP); Masatoshi Nojiri, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 4 days.

(21) Appl. No.: 14/664,964

(22) Filed: Mar. 23, 2015

(65) Prior Publication Data

US 2015/0273993 A1     Oct. 1, 2015

(30) Foreign Application Priority Data

Mar. 26, 2014   (JP) .................................. 2014-063358

(51) Int. Cl.
*B60J 10/08*   (2006.01)

(52) U.S. Cl.
CPC ............. *B60J 10/081* (2013.01); *B60J 10/277* (2016.02); *B60J 10/84* (2016.02); *B60J 10/7775* (2016.02)

(58) Field of Classification Search
CPC ...... B60J 10/081; B60J 10/277; B60J 10/84; B60J 10/7775
See application file for complete search history.

(56) References Cited

U.S. PATENT DOCUMENTS

| | | | | |
|---|---|---|---|---|
| 5,105,580 | A * | 4/1992 | Akachi | B60J 10/08 49/441 |
| 5,383,701 | A * | 1/1995 | Okada | B60J 10/248 296/146.9 |
| 5,806,914 | A | 9/1998 | Okada | |
| 5,964,496 | A * | 10/1999 | Nozaki | B60J 10/246 296/146.9 |
| 7,871,120 | B2 * | 1/2011 | Dietz | B60J 10/0065 296/146.9 |
| 8,215,700 | B2 * | 7/2012 | Alvarez | B60R 13/04 296/1.08 |

FOREIGN PATENT DOCUMENTS

| JP | H06-305050 A | 11/1994 |
|---|---|---|
| JP | 08-258639 A | 10/1996 |

OTHER PUBLICATIONS

Extended European Search Report issued Nov. 4, 2015 in the corresponding EP application No. 15160393.3.

* cited by examiner

*Primary Examiner* — Lori L Lyjak
(74) *Attorney, Agent, or Firm* — Posz Law Group, PLC

(57) ABSTRACT

A center pillar weather strip attached to a center pillar includes an attachment base that attached to the center pillar, a front side linkage part that extends obliquely upward in a front direction of the car body from the attachment base, a rear side linkage part that extends from the attachment base to a rear direction of the car body, a hollow seal part that is linked to tips of the front side linkage part and the rear side linkage part and formed in a shape curved convex to a car outside, and a front side seal lip that extends from a connection portion between the front side linkage part and the hollow seal part toward an extending direction of the hollow seal part and formed in a shape curved convex to the center pillar side.

6 Claims, 2 Drawing Sheets

PRIOR ART

CENTER PILLAR WEATHER STRIP

CROSS-REFERENCE TO RELATED APPLICATIONS

This application claims the benefit of Japanese Patent Application No. 2014-063358 (filed on Mar. 26, 2014), the entire contents of which are hereby incorporated by reference.

BACKGROUND

1. Technical Field

The present invention relates to a center pillar weather strip attached to a center pillar of the car body of an automobile.

2. Related Art

As shown in FIG. 4, in the conventional art, a center pillar 4 of the car body of an automobile is provided with a center pillar weather strip 110 for sealing a gap between the rear end 2a of a front door 2 and the front end 3a of a rear door 3.

The center pillar weather strip 110 includes: an attachment base 111 attached to the center pillar 4; and a hollow seal part 118 having a hollow shape and formed from the attachment base 111 to the vehicle outside direction In the locus of the rear end 2a of a case that the front door 2 is to be closed, the door is closed from the direction indicated by an arrow X in FIG. 4. In the locus of the front end 3a of a case that the rear door 3 is to be closed, the door is closed from the direction indicated by an arrow Y in FIG. 4. Then, the rear end 2a of the front door 2 and the front end 3a of the rear door 3 individually abut against the hollow seal part 118 so that sealing is achieved.

As such, the front door 2 and the rear door 3 move differently from each other. Thus, in a case that the front door 2 and the rear door 3 are closed independently, if the hollow seal part 118 of the center pillar weather strip 110 protrudes from a gap between the rear end 2a of the front door 2 and the front end 3a of the rear door 3, aesthetic appearance is damaged. Accordingly, the material thickness of the hollow seal part 118 is made increased (for example, see Patent Document JP-A-8-258639).

Thus, the rigidity of the hollow seal part 118 increases and hence, when the front door 2 and the rear door 3 are individually to be closed, the hollow seal part 118 becomes difficult to bend. Accordingly, the door closing load increases and hence such a configuration is unpreferable.

Thus, the problem is to provide a center pillar weather strip resulting in a low door-closing load and having a satisfactory sealing property.

SUMMARY (1) According to an aspect of the invention, a center pillar weather strip attached to a center pillar of a car body of an automobile includes:

an attachment base that attached to the center pillar;

a front side linkage part that extends obliquely upward in a front direction of the car body from the attachment base;

a rear side linkage part that extends from the attachment base to a rear direction of the car body;

a hollow seal part that is linked to tips of the front side linkage part and the rear side linkage part and formed in a shape curved convex to a car outside; and a front side seal lip that extends from a connection portion between the front side linkage part and the hollow seal part toward an extending direction of the hollow seal part and formed in a shape curved convex to the center pillar side.

With the above configuration (1), in the center pillar weather strip attached to a center pillar of the car body of an automobile, the center pillar weather strip includes the attachment base attached to the center pillar. Thus, when the hollow seal part is held by the attachment base and then the attachment base is attached to the center pillar, the hollow seal part is directed to a gap between the front door and the rear door.

The center pillar weather strip includes: the front side linkage part extending obliquely upward in a front direction of the car body from the attachment base; and the rear side linkage part extending from the attachment base to a rear direction of the car body. Thus, the hollow seal part is held by the front side linkage part and the rear side linkage part so that a seal part of hollow shape is formed. The front side linkage part extends obliquely upward in the front direction of the car body. Thus, when the rear end of the front door abuts against the hollow seal part, the front side linkage part can bend toward the center pillar. Accordingly, a reaction force of the hollow seal part acting on the rear end of the front door is small and hence the door closing load of the front door is reduced.

The center pillar weather strip includes the hollow seal part linked to tips of the front side linkage part and the rear side linkage part and formed in a shape curved convex to the car outside. Thus, the curved hollow seal part can reliably close the gap between the rear end of the front door and the tip of the rear door in the center pillar.

The front side seal lip extends from the connection portion between the front side linkage part and the hollow seal part to the extending direction of the hollow seal part. Thus, the tip of the front side seal lip can abut against the center pillar and hence the sealing property between the center pillar weather strip and the center pillar is improved. The front side seal lip is formed in a shape curved convex to the center pillar side. Thus, when the front door is closed so that the rear end abuts against the hollow seal part of the center pillar weather strip, the lower face side of the front side seal lip has a curved surface and can slide on the surface of the center pillar. Accordingly, the front side linkage part and the hollow seal part can easily bend so that the door closing load of the front door is reduced.

(2) In the center pillar weather strip of (1), when a front door is open, there is a gap between a tip of the front side seal lip and the center pillar.

With the above configuration (2), when the front door is open, a gap is generated between a tip of the front side seal lip and the center pillar. Thus, when the front door is closed so that the rear end abuts against the hollow seal part of the center pillar weather strip, the front side linkage part can easily bend by a dimension corresponding to the gap. Accordingly, a reaction force of the hollow seal part acting on the rear end of the front door is small and hence the door closing load of the front door is reduced.

(3) In the center pillar weather strip of (1) or (2), an angle formed by the front side linkage part and the center pillar is 5 to 45 degrees.

With the above configuration (3), the angle formed by the front side linkage part and the center pillar is 5 to 45 degrees. Thus, when the front door is closed so that the rear end of the front door abuts against the hollow seal part of the center pillar weather strip, the front side linkage part can easily bend and hence the door closing load of the front door is reduced. If the angle formed by the front side linkage part and the center pillar is smaller than 5 degrees, the front side linkage part cannot largely bend. Further, if the angle formed by the front side linkage part and the center pillar exceeds 45 degrees, the front side linkage part acts like a strut. Thus, the front side linkage part becomes difficult to bend and hence the door closing load of the front door becomes difficult to be reduced.

(4) In the center pillar weather strip of any one of (1) to (3) further includes:

a rear side seal lip that extends from a connection portion between the rear side linkage part and the hollow seal part toward an extending direction of the hollow seal part; and a deformation dividing part that prevents an influence of deformation of the rear side seal lip from being transmitted to the hollow seal part and is formed in a connection portion between the rear side seal lip and the hollow seal part.

With the above configuration (4), the rear side seal lip extends from the connection portion between the rear side linkage part and the hollow seal part toward the extending direction of the hollow seal part. Thus, the sealing property between the center pillar weather strip and the center pillar is improved. The deformation dividing part for not transmitting to the hollow seal part the influence of deformation of the rear side seal lip has been formed in the connection portion between the rear side seal lip and the hollow seal part. Thus, even when the rear side seal lip vibrate in association with vibration or the like of the car body, the vibration is not transmitted to the hollow seal part and hence the sealing property of the hollow seal part is ensured. Further, at the time of abutting against the front end of the rear door, the deformation of the hollow seal part is not transmitted to the rear side seal lip. Thus, the rear side seal lip does not rise from the center pillar and hence the sealing property of the rear side seal lip is ensured.

(5) In the center pillar weather strip of any one of (1) to (3), the rear side seal lip extends from a lower face of the rear side linkage part separate from a connection portion between the rear side seal lip of the rear side linkage part and the hollow seal part.

(6) In the center pillar weather strip of (1), when a front door is open, a tip of the front side seal lip is in contact with a surface of the center pillar.

With the above configuration (5), the rear side seal lip extends from the lower face of the rear side linkage part separate from the connection portion between the rear side seal lip of the rear side linkage part and the hollow seal part. Thus, when the front end of the rear door abuts against the hollow seal part, the deformation of the hollow seal part is not transmitted to the rear side seal lip and hence the sealing property of the rear side seal lip is ensured.

The front side seal lip extends from the connection portion between the front side linkage part and the hollow seal part to the extending direction of the hollow seal part. Thus, the sealing property between the center pillar weather strip and the center pillar is improved. The front side seal lip is formed in a shape curved convex to the center pillar side. Thus, when the rear end of the front door abuts against the hollow seal part of the center pillar weather strip, the front side seal lip can slide on the surface of the center pillar and hence the front side linkage part and the hollow seal part can easily bend. Accordingly, the door closing load of the front door is reduced.

DETAILED DESCRIPTION

Figure 1:
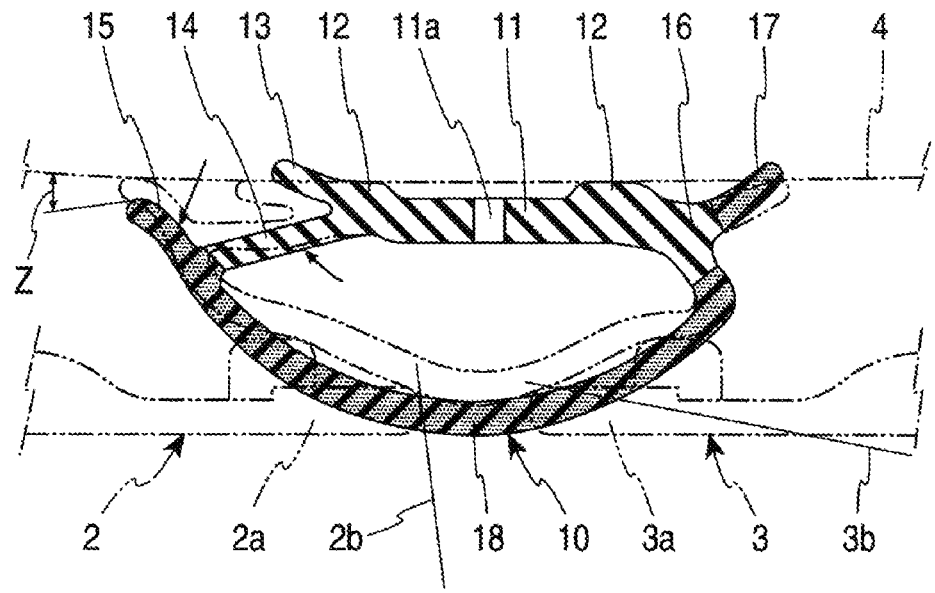
FIG. 1 is a sectional view of a center pillar weather strip in a first embodiment of the present invention, taken along line A-A in FIG. 3.

The present invention relates to a center pillar weather strip 10 that is attached to a center pillar 4 of a car body 1 of an automobile and that seals the part between a front door 2 and a rear door 3. Embodiments of the present invention is described below with reference to FIGS. 1 to 3. A first embodiment of the present invention is first described below and then a second embodiment is described.

Figure 3:
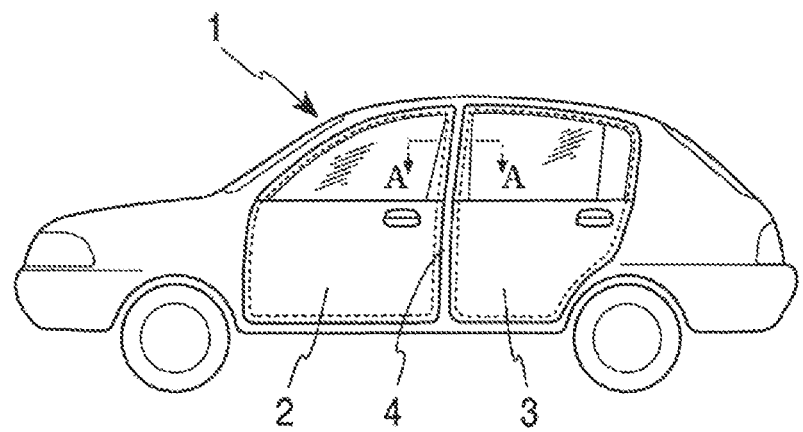
FIG. 3 is a side view of an automobile.
Figure 4:
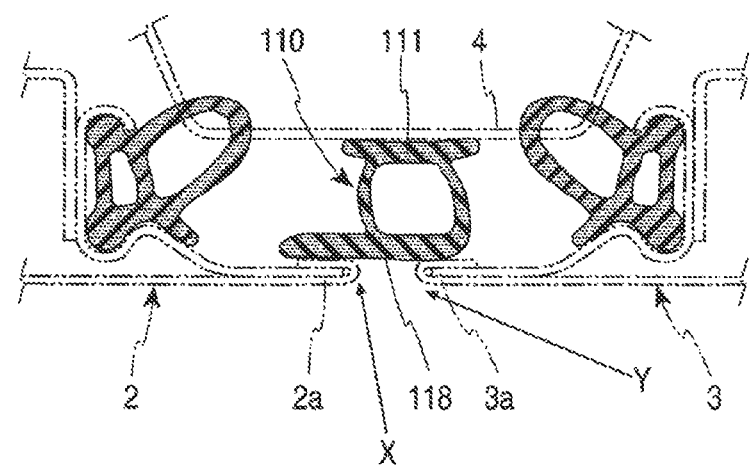
FIG. 4 is a sectional view of a center pillar weather strip of the conventional art.

FIG. 1 shows the first embodiment of the present invention. FIG. 3 is a side view of an automobile. As shown in FIG. 3, a center pillar 4 is provided near the center of a side surface of a car body 1 of an automobile. Then, a gap is generated between the rear end 2a of the front door 2 and the front end 3a of the rear door 3 in the portion of the center pillar 4. A center pillar weather strip 10 for sealing the gap is attached to the center pillar 4.

As shown in FIG. 1, the center pillar weather strip 10 according to the first embodiment of the present invention includes: an attachment base 11 attached to a center pillar 4; a front side linkage part 14 extending obliquely upward in the front direction of the car body 1 from the attachment base 11; a rear side linkage part 16 extending from the attachment base 11 to the rear direction of the car body 1; and a hollow seal part 18 linked to tips of the front side linkage part 14 and the rear side linkage part 16 and formed in a shape curved convex to the car outside.

The attachment base 11 is formed in a flat plate shape. Then, an attachment base leg 12 abutting against the center pillar 4 is formed at each of two sites on the front side and rear side of the bottom face of the attachment base 11. By virtue of the attachment base legs 12, the attachment base 11 can stably be attached to the center pillar 4. As for attaching of the attachment base 11 to the center pillar 4, clip attaching holes 11a may be provided in the attachment base 11 and in the center pillar 4 and then they may be attached to each other with clips (not shown). Alternatively, the bottom face of the attachment base 11 may be attached by adhesion with a double-sided adhesive tape.

An attachment base lip 13 may be formed at the tip of the front side of the attachment base 11. The tip of the attachment base lip 13 abuts against the center pillar 4 so as to improve the sealing property between the attachment base 11 and the center pillar 4.

In the first embodiment, the attachment base 11, the attachment base legs 12, the attachment base lip 13, the front side linkage part 14, and the rear side linkage part 16 are formed from a solid material. Employable solid materials include EPDM rubber. Here, the attachment base lip 13, the front side linkage part 14, and the rear side linkage part 16 may be formed from a sponge material.

The hollow seal part 18 is linked to the tips of the front side linkage part 14 and the rear side linkage part 16 and formed in an arc shape curved convex to the car outside in sectional view. The hollow seal part 18 abuts against the rear end 2a of the front door 2 and the front end 3a of the rear door 3 in the center pillar 4 so that the hollow seal part 18 can reliably close the gap between the rear end 2a of the front door 2 and the front end 3a of the rear door 3.

Since the hollow seal part 18 is hollow and arc-shaped, the hollow seal part 18 can close the gap and, at the same time, can easily bend at the time of abutting against the rear end 2a of the front door 2 and the front end 3a of the rear door 3 so that the sealing property is ensured. Further, the hollow seal part 18 may be formed from a rubber sponge material such as EPDM similarly to a front side seal lip 15 and a rear side seal lip 17 described later.

The front side linkage part 14 is formed such as to extend obliquely upward in the front direction of the car body 1 from the attachment base 11. In the first embodiment, the front side linkage part 14 is formed in an integrated manner with the attachment base 11 and is formed from a solid material. Employable solid materials include EPDM rubber and olefin-based thermoplastic elastomer.

It is preferable that the angle formed by the front side linkage part 14 and the center pillar 4 is 5 to 45 degrees. When the front door 2 is open and hence the rear end 2a of the front door 2 does not abut against the hollow seal part 18, the tip side of the front side linkage part 14 has a later-described gap Z formed relative to the center pillar 4. Thus, when the front door 2 is closed so that the rear end 2a of the front door 2 abuts against the hollow seal part 18 of the center pillar weather strip 10, the front side linkage part 14 can easily be bent by being pushed by the hollow seal part 18 and hence the door closing load of the front door 2 is reduced.

If the angle formed by the front side linkage part 14 and the center pillar 4 is smaller than 5 degrees, the gap formed relative to the center pillar 4 becomes reduced. Thus, the front side linkage part 14 cannot largely bend and hence the front side linkage part 14 becomes difficult to bend. Further, if the angle formed by the front side linkage part 14 and the center pillar 4 exceeds 45 degrees, the angle of the front side linkage part 14 relative to the center pillar 4 increases. Thus, the front side linkage part 14 acts like a strut and hence becomes difficult to be bent even when pushed by the hollow seal part 18. Accordingly, the door closing load of the front door 2 becomes difficult to be reduced.

When the front door 2 is open and hence does not abut against the hollow seal part 18, there is a gap (indicated by Z in FIG. 1) between the tip of the front side seal lip 15 and the center pillar 4. Thus, when the front door 2 is closed so that the rear end 2a of the front door 2 abuts against the hollow seal part 18 of the center pillar weather strip 10, the hollow seal part 18 is pushed so that the front side linkage part 14 is bent. Thus, as indicated by a dashed double-dotted line in FIG. 1, the front side linkage part 14 can easily bend by a dimension corresponding to the gap and hence the door closing load of the front door 2 is reduced.

The gap may be set to be approximately 0.6 to 0.8 mm.

The front side seal lip 15 extends from the connection portion between the front side linkage part 14 and the hollow seal part 18 to the extending direction of the hollow seal part 18. Thus, when the front door 2 is closed, the front side seal lip 15 is pushed by the hollow seal part 18 and thereby moves by a distance corresponding to the gap Z so as to abut against the center pillar 4. According, the sealing property between the center pillar weather strip 10 and the center pillar 4 is improved.

The front side seal lip 15 is formed in a shape curved convex to the center pillar 4 side (upward in FIG. 1). Thus, when the front door 2 is closed so that the rear end 2a of the front door 2 abuts against the hollow seal part 18 of the center pillar weather strip 10, the tip of the front side seal lip 15 has the curved surface and hence can slide on the surface of the center pillar 4. Accordingly, the front side linkage part 14 and the hollow seal part 18 can easily bend and hence the door closing load of the front door 2 is reduced.

A rear side seal lip 17 extends from the connection portion between the rear side linkage part 16 and the hollow seal part 18 or, alternatively, from the tip on the rear side of the attachment base 11. The rear side seal lip 17 is formed convex upward (upward in FIG. 1). When the attachment base 11 is attached to the center pillar 4, the tip of the rear side seal lip 17 abuts against the center pillar 4 and hence the sealing property between the center pillar weather strip 10 and the center pillar 4 is improved.

In the first embodiment, when the front door 2 is open and hence the rear end 2a of the front door 2 does not abut against the hollow seal part 18, the tip of the front side seal lip 15 had the gap Z formed relative to the center pillar 4. Instead, the tip of the front side seal lip 15 may abut against the surface of the center pillar 4 even when the front door 2 is open and hence the rear end 2a of the front door 2 does not abut against the hollow seal part 18. Here, the seal lip 15 is formed such as to be curved in a free state.

Next, the second embodiment of the present invention is described below with reference to FIG. 2. In the second embodiment, the shapes of the rear side linkage part 16 and the rear side seal lip 17 are different from those of the first embodiment and the other points are similar to those of the first embodiment. Thus, the different points alone are described and description of the similar points is omitted.

The rear side linkage part 16 extends obliquely upward from the rear side tip of the attachment base 11, then the rear side linkage part 16 and the hollow seal part 18 are linked to each other, and then the rear side seal lip 17 extends from the connection portion between the rear side linkage part 16 and the hollow seal part 18 toward the extending direction of the hollow seal part 18. Thus, the tip of the rear side seal lip 17 can abut against the center pillar 4 and hence the sealing property between the center pillar weather strip 10 and the center pillar 4 is improved. In the second embodiment, the hollow seal part 18, the rear side linkage part 16, the rear side seal lip 17, and the front side linkage part 14 are formed from a sponge material. The rear side seal lip 17 and the front side linkage part 14 may be formed from a solid material.

A deformation dividing part 19 for not transmitting to the hollow seal part 18 the influence of deformation of the rear side seal lip 17 is formed in the connection portion between the rear side seal lip 17 and the hollow seal part 18. In the present embodiment, the deformation dividing part 19 is formed as a recess formed by reducing the thickness of the connection portion between the rear side seal lip 17 and the hollow seal part 18. Like the rear side seal lip 17 indicated by a dashed line in FIG. 2, the rear side seal lip 17 may be formed separate from the connection portion between the hollow seal part 18 and the rear side linkage part 16 so that the separation portion may be employed as the deformation dividing part 19.

By virtue of the deformation dividing part 19 having been formed, even when the rear side seal lip 17 vibrates in association with vibration or the like of the car body, the vibration is not transmitted to the hollow seal part 18 and hence the sealing property of the hollow seal part 18 is ensured. Further, at the time of abutting against the front end 3a of the rear door 3, the deformation of the hollow seal part 18 is not transmitted to the rear side seal lip 17. Further, the rear side seal lip 17 does not rise from the center pillar 4 and hence the sealing property of the rear side seal lip 17 is ensured.

As described above, the rear side seal lip 17 may extend from the lower face of the rear side linkage part 16 separate from the connection portion between the rear side linkage part 16 and the hollow seal part 18. In this case, when the front end 3a of the rear door 3 abuts against the hollow seal part 18, the deformation of the hollow seal part 18 is not transmitted to the rear side seal lip 17 and hence the sealing property of the rear side seal lip 17 is ensured.

Next, the motion of the rear end 2a of the front door 2 and the front end 3a of the rear door 3 and the operation of the center pillar weather strip 10 are described below.

Figure 2:
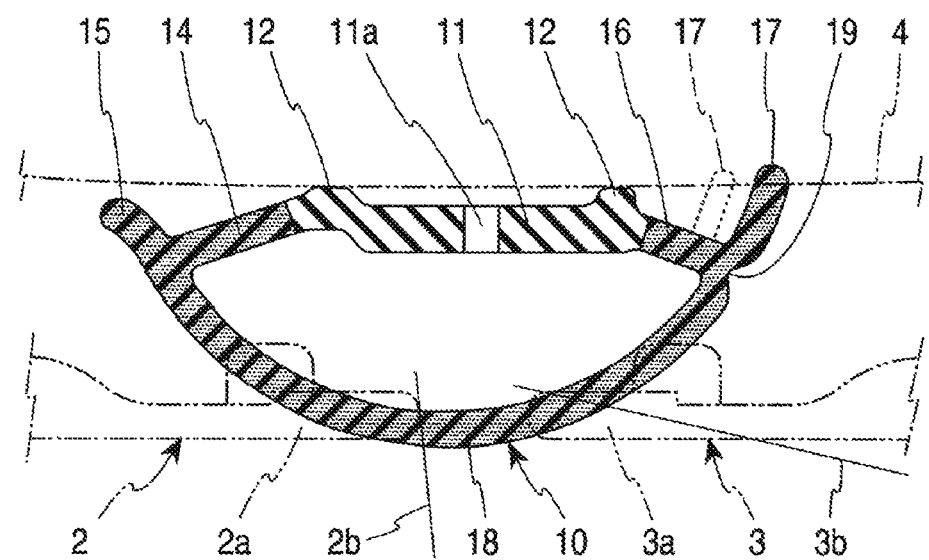
FIG. 2 is a sectional view of a center pillar weather strip in a second embodiment of the present invention, taken along line A-A in FIG. 3.

When the front door 2 is to be closed, the rear end 2a of the front door 2 goes along the locus indicated by a solid line 2b in FIGS. 1 and 2 and then abuts against the hollow seal part 18 of the center pillar weather strip 10.

At that time, the center pillar weather strip 10 deforms as indicated by a dashed double-dotted line in FIG. 1. That is, the hollow seal part 18 is pushed and bent by the rear end 2a of the front door 2 and, at the same time, pushes the front side linkage part 14 so that the front side linkage part 14 is bent toward the center pillar 4. By virtue of this, the front side seal lip 15 can easily bend by a distance corresponding to the gap Z formed relative to the center pillar 4 and hence the front door 2 can be closed easily.

Further, since the front side seal lip 15 abuts against the center pillar 4 and the front side seal lip 15 is formed in a curved shape, the tip of the front side seal lip 15 moves and slides on the surface of the center pillar 4. Thus, the hollow seal part 18 can easily bend and hence a reaction force of the hollow seal part 18 acting on the rear end 2a of the front door 2 is reduced so that the door closing load of the front door 2 is reduced. Further, the hollow seal part 18 abuts against the rear end 2a of the front door 2 so as to be bent. Thus, the sealing property relative to the rear end 2a of the front door 2 is ensured and, at the same time, the hollow seal part 18 does not protrude from the part between the rear end 2a of the front door 2 and the front end 3a of the rear door 3.

When the rear door 3 is to be closed, the front end 3a of the rear door 3 goes along the locus indicated by a solid line 3b in FIGS. 1 and 2 and then abuts against the hollow seal part 18 of the center pillar weather strip 10.

At that time, the center pillar weather strip 10 deforms as indicated by a dashed double-dotted line in FIG. 1. That is, the hollow seal part 18 is pushed and bent by the front end 3a of the rear door 3 and, at the same time, pushes the rear side linkage part 16 so that the rear side linkage part 16 is bent toward the center pillar 4. By virtue of this, the rear side seal lip 17 abuts against the center pillar 4 so as to be bent easily and hence the rear door 3 can be closed easily.

At that time, as shown in FIG. 2, in the second embodiment as described above, the deformation dividing part 19 for not transmitting to the hollow seal part 18 the influence of deformation of the rear side seal lip 17 has been formed in the connection portion between the rear side seal lip 17 and the hollow seal part 18. Thus, even when the rear side seal lip 17 vibrates in association with vibration or the like of the car body, the vibration is not transmitted to the hollow seal part 18 and hence the sealing property of the hollow seal part 18 is ensured. Further, when the rear door 3 abuts against the front end 3a, the deformation of the hollow seal part 18 is not transmitted to the rear side seal lip 17 and hence the sealing property of the rear side seal lip 17 is ensured.

Further, since the deformation dividing part 19 has been formed, the hollow seal part 18 can easily bend and hence the door closing load of the rear door 3 is reduced. Further, the hollow seal part 18 abuts against the front end 3a of the rear door 3 so as to be bent. Thus, the sealing property relative to the front end 3a of the rear door 3 is ensured and, at the same time, the hollow seal part 18 does not protrude from the part between the front end 3a of the rear door 3 and the front end 3a of the rear door 3.

What is claimed is:

1. A center pillar weather strip attached to a center pillar of a car body of an automobile comprising:
    an attachment base that attached to the center pillar;
    a front side linkage part that extends obliquely upward in a front direction of the car body from the attachment base;
    a rear side linkage part that extends from the attachment base to a rear direction of the car body;
    a hollow seal part that is linked to tips of the front side linkage part and the rear side linkage part and formed in a shape curved convex to a car outside; and
    a front side seal lip that extends from a connection portion between the front side linkage part and the hollow seal part toward an extending direction of the hollow seal part and formed in a shape curved convex to the center pillar side.

2. The center pillar weather strip according to claim 1, wherein when a front door is open, there is a gap between a tip of the front side seal lip and the center pillar.

3. The center pillar weather strip according to claim 1, wherein an angle formed by the front side linkage part and the center pillar is 5 to 45 degrees.

4. The center pillar weather strip according to claim 1 further comprising:
    a rear side seal lip that extends from a connection portion between the rear side linkage part and the hollow seal part toward an extending direction of the hollow seal part; and
    a deformation dividing part that prevents an influence of deformation of the rear side seal lip from being transmitted to the hollow seal part and is formed in a connection portion between the rear side seal lip and the hollow seal part.

5. The center pillar weather strip according to claim 1, wherein the rear side seal lip extends from a lower face of the rear side linkage part separate from a connection portion between the rear side seal lip of the rear side linkage part and the hollow seal part.

6. The center pillar weather strip according to claim 1, wherein when a front door is open, a tip of the front side seal lip is in contact with a surface of the center pillar.

* * * * *